April 6, 1965 W. M. CARVER ETAL 3,176,405
CONCRETE PAVEMENT SAWED JOINT DEPTH MARKER
Filed April 16, 1962 2 Sheets-Sheet 1
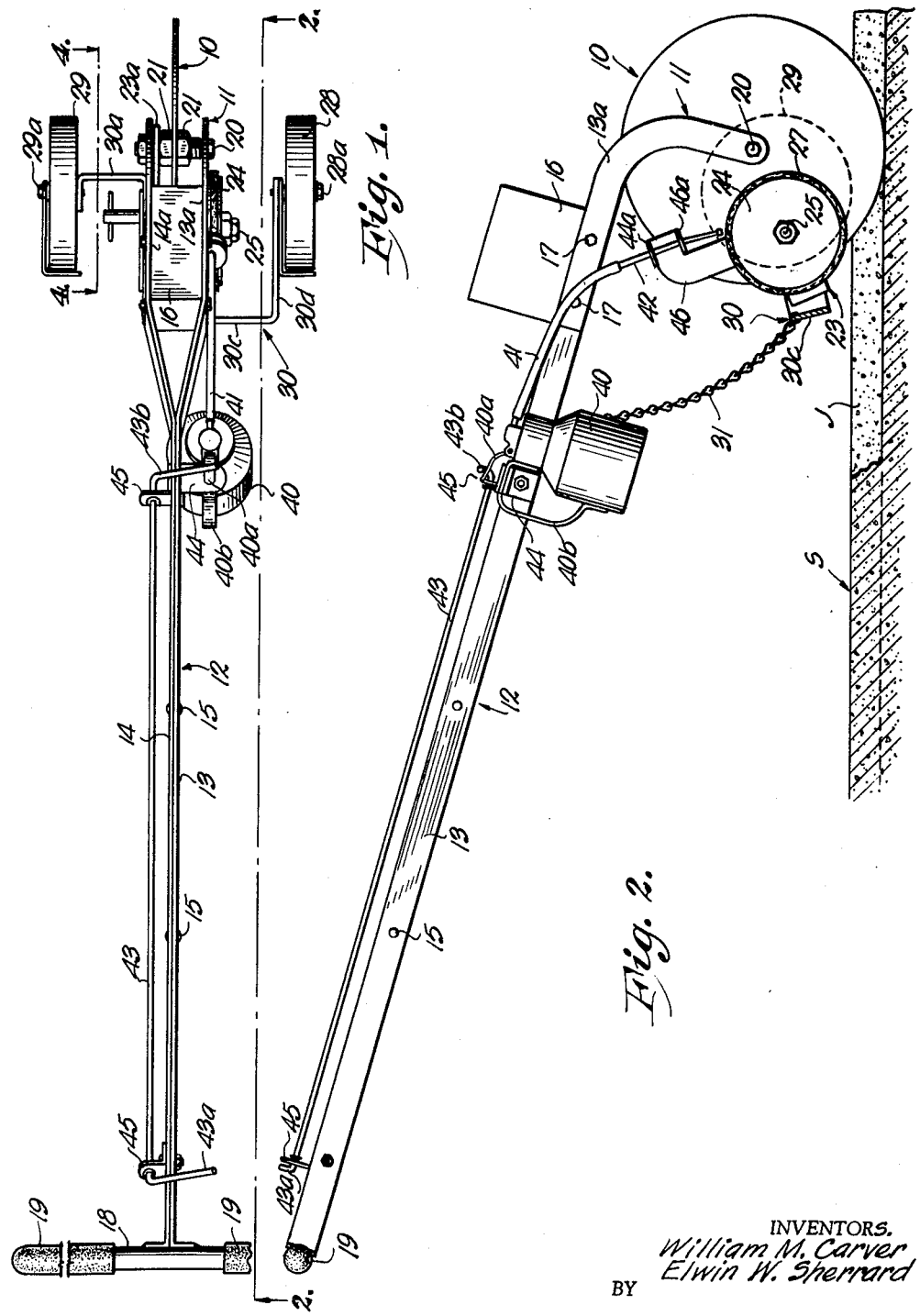
INVENTORS.
William M. Carver
Elwin W. Sherrard
BY
Scofield, Kokjer, Scofield & Lowe
ATTORNEYS.

April 6, 1965   W. M. CARVER ETAL   3,176,405
CONCRETE PAVEMENT SAWED JOINT DEPTH MARKER
Filed April 16, 1962   2 Sheets-Sheet 2

INVENTORS.
William M. Carver
Elwin W. Sherrard
BY
ATTORNEYS.

United States Patent Office 3,176,405
Patented Apr. 6, 1965

3,176,405
CONCRETE PAVEMENT SAWED JOINT
DEPTH MARKER
William M. Carver and Elwin W. Sherrard, Lincoln, Nebr.,
assignors to the State of Nebraska
Filed Apr. 16, 1962, Ser. No. 187,790
11 Claims. (Cl. 33—169)

This invention relates generally to the field of construction machinery and refers more particularly to apparatus for improving speed and efficiency in obtaining satisfactory sawed joints in highway and other concrete slab construction.

Much modern highway construction involves the laying of continuous ribbons of concrete. However, standards for such construction require that ribbons be provided at properly spaced intervals with longitudinal and transverse grooves or joints which must have a certain preselected minimum depth. One prevalent method of forcing such joints is to use a concrete saw, the saw being propelled across the ribbon shortly after the concrete hardens with the blade theoretically held to the depth of the cut desired. However, human error, among other things, often results in cuts or joints which, at various points, are less than the prescribed depth. Accordingly, it is necessary, after the initial cut is made, to inspect the joint and if undesirable variations from the preset standard are present, re-saw the joint at these locations.

The determination of the depth, as well as providing the necessary guidance to the saw operator to obtain the necessary remedial work, has been a tedious and time-consuming task. Not only is it difficult to rapidly measure the variations in depth of a long cut, it also is difficult to determine the length of the substandard segment of the cut and to convey this information to the saw operators.

One of the principal objects of the present invention is to provide apparatus which is operable to measure the profile of the bottom of the sawed joint quickly and efficiently, particularly to obtain a running indication of those segments where the joint is of substandard depth and, at the same time, provide a visible marking which is useable by the saw operator to guide the saw to and define the exact length of the substandard segment.

A further object of the invention is to provide apparatus of the character described which is hand propelled and which requires no action on the part of the operator other than pushing it lengthwise along the joint to obtain the visible marking referred to above. It is a feature of the invention in this respect that little effort is required on the part of the operator to propel the apparatus, and that the marking of the substandard segments is accomplished automatically as the apparatus is advanced.

Still another object of the invention is to provide apparatus of the character described which is so constructed that the unit can be readily adapted to the measurement of joints which differ from one another in average depth. In other words, the unit can be adapted to the inspection and marking of grooves having different depth standards. Consequently, one machine can be used for a wide variety of concrete construction.

Yet another object of the invention is to provide apparatus of the character described which is so simple in its operation that it can be successfully used by unskilled workers with a minimum of instruction.

Still another object of the invention is to provide apparatus of the character described which is simple in construction yet capable of withstanding rugged use over a long period of time.

Other and further objects of the invention together with the features of novelty appurtenant thereto will appear in the course of the following description.

In the accompanying drawings, which form a part of the specification and are to be read in conjunction therewith, and in which like reference numerals indicate like parts in the various views;

FIG. 1 is a top plan view of a preferred apparatus embodying our invention;

FIG. 2 is a partly sectional view taken generally along the line 2—2 of FIG. 1 in the direction of the arrows, and showing the gauge disk inserted in operating position in a sawed joint;

Figure 3:
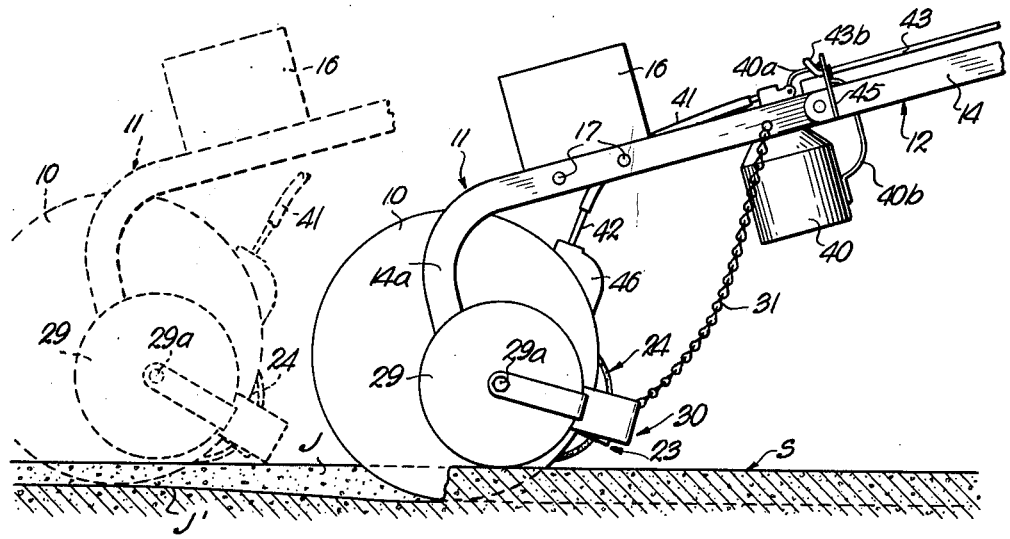
FIG. 3 is an enlarged fragmentary side elevation of the preferred unit, taken generally from the side opposite that seen in FIG. 2.

Referring to the drawing, one of the principal elements of the preferred apparatus comprises the circular gauge disk 10, which is preferably constructed of good quality steel. The thickness of the disk is such that it is capable of loose insertion into the saw joint J cut in the concrete slab S, and as will be evident, the radius of the disk is substantially greater than the depth of the joint.

The disk 10 is journaled for rotation in a yoke 11 formed at the forward end of a handle structure 12. In the illustrated embodiment, the main body of the handle structure is formed by joining back to back the metal strips 13, 14 along the major portions of their lengths, as by longitudinally spaced rivets 15. The strips diverge at their forward ends to form the yoke legs 13a, 14a which terminate in portions extending generally normal to the main body of the handle structure. A combined spacer and weighting block 16 is disposed between the legs and secured thereto as by bolts 17. The rear end of the handle structure includes the cross member 18 which forms a hand bar which can be fitted with rubber or other suitable hand grips 19.

The disk 10 is supported between the legs of the yoke for free rotation about a central axis on an axle formed by the cross bolt 20 which extends through suitable apertures provided in the respective legs. The large sleeve nuts 21 hold the disk on a bushing which encircles the bolt 20 and is rotatable thereon. Washers 22 are interposed respectively between the confronting faces of nuts 21 and the disk and assist in providing a stable hub for the disk.

Figure 4:
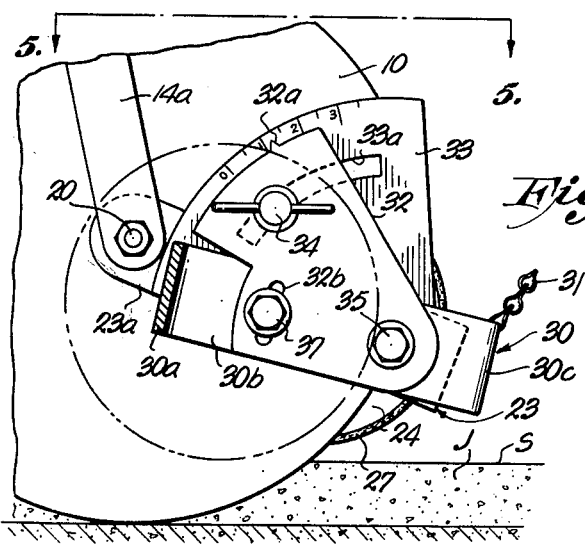
FIG. 4 is a greatly enlarged fragmentary sectional view taken along the line 4—4 of FIG. 1 in the direction of the arrows.
Figure 6:
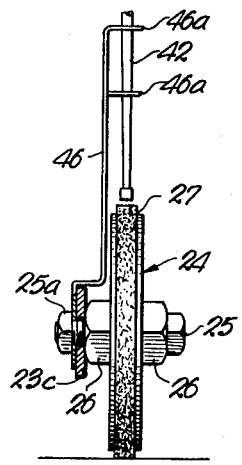
FIG. 6 is a sectional view taken along line 6—6 of FIG. 5 in the direction of the arrows.
Figure 5:
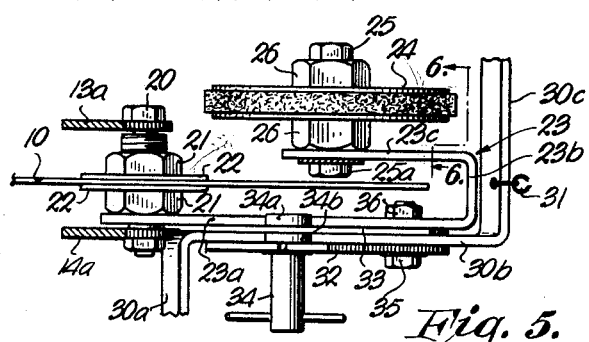
FIG. 5 is a fragmentary sectional view taken generally along the line 5—5 of FIG. 4 in the direction of the arrows.

Referring now more particularly to FIGS. 4 and 5, it will be observed that disposed on one side of the disk 10 and pivotally connected at its forward end with the axle bolt 20 is one leg 23a of the U-shaped member 23 having the bight portion 23b and opposed leg 23c. The bight 23b is disposed rearwardly of and sufficiently spaced from the rim of the disk as to permit substantial pivotal movement of the U-shaped member with respect to the disk.

Supported on the forward end of the forwardly extending leg 23c of member 23 is a marking wheel 24. The axis of the wheel is formed by the axle bolt 25. Sleeve nuts 26 serve to mount the wheel 24 on bolt 25 for rotation thereon and the bolt is secured to leg 23c by the nut 25a. The rim of the marking wheel is formed by a porous pad 27, preferably felt, the purpose of which will be described later.

Disposed on opposite sides of the gauge disk and spaced sufficiently therefrom as to ride on the surface of the slab S on opposite sides of the saw joint are the wheels 28, 29 which can be conventional rubber tired wheels. The wheels are journaled, respectively, on stub axles 28a, 29a which are secured to and extend from the opposite end portions of a generally Z-shaped carrier member 30.

As may best be seen from FIGS. 1, 4 and 5, the carrier 30 includes a first lateral leg 30a, a fore and aft leg 30b, a lateral rear bight portion 30c, and a forwardly extending leg 30d. As shown, the leg 30d is spaced well to the outside of marking wheel 24, and the bight portion 30c is spaced from the rim of the gauge disk 10 so as to permit swinging of the carrier member about the common axis of the wheels 28, 29 without interference. A flexible chain 31 has one end secured to the bight 30c of the carrier and the other to the handle structure 12. This chain is given a length such that when the rim of the gauge disk 10 is resting on the flat slab S rather than in the joint J, the bight 30c will be supported slightly above the slab so it does not drag thereon when the unit is propelled along on top of the slab and riding on the disk alone. In normal operation the chain is loose and serves no function.

The fore and aft leg 30b of the carrier and parallel and adjacent leg 23a of the U-shaped marking wheel support member 23 are adjustably secured to one another by the index plate 32, gauge plate 33, clamping nut 34, and common pivot bolt 35, all best seen in FIGS. 4 and 5. The bolt 35 extends through aligned apertures in leg 30b and leg 23a and is retained by the nut 36 on the inside of leg 23a. The index plate 32 is secured to leg 30b by bolt 35 and by the machine screw 37. The index plate has the pointer 32a.

The gauge plate 33 is secured firmly to the leg 23a and is provided with an arcuate slot 33a through which extends the releasable clamping member 34. The latter is provided with the spacer and head portions 34a and 34b, respectively. Normally, the clamping screw is tightened down so that the plates 32 and 33 are incapable of movement relative to one another. However, if the clamping screw is backed off it will be evident that the U-shaped member can be pivoted about bolt 35 relative to the carrier member 30 and a new relationship is established.

It will be understood that in actual kinematic effect the U-shaped marking wheel carrier may be regarded as a simple beam supported for rocking movement about an axis defined by the support wheel axles 28a, 29a. Connected with this beam on the forward side of the axis is the gauge disk 10. On the rearward side of said axis is the marking wheel 24 which also is connected with the beam. Any upward movement of the gauge disk relative to the support wheel axis will therefore be accompanied by downward displacement of the marking wheel. When the depth of the groove is equal to or greater than the standard depth, the marking wheel is free of contact with the slab. Through the use of the U-shaped and Z-shaped members 23 and 30 we have been able to bring the axis of the marking wheel fairly close to the axis of the gauge disk, the reason for which will later be discussed.

As previously noted, the marking wheel 24 is provided with the porous rim pad 27 which, as indicated, may be of felt or other material capable of receiving and retaining a quantity of liquid marking substance, for example, a suitable ink. Since in use of the unit the supply carried in the pad 27 becomes exhausted as deposits are made on the slab, we have included means operable to supply additional liquid to the pad as needed. This includes the container 40, delivery tube 41 which terminates in spout 42, and the actuating mechanism which has as its main control element the elongate rod 43 extending upwardly from the container along the handle structure 12.

The container 40 can conveniently be a conventional oil can equipped with the thumb operated plunger pump lever 40a. It is supported on the handle structure 12 by means of a clamp bracket 44 which engages and holds the handle 40b of the container and supports the container in a generally upright position. The control rod 43 is supported rotatably on the handle structure 12 by the apertured ears 45 secured to the latter. The upper end of the control rod has the laterally extending hand grip 43a and a similar extension 43b overlies the pump lever 40a in close proximity thereto. Obviously by turning the rod 43 the lever can be depressed to discharge the marking liquid from the container.

The spout 42 is supported by an upstanding bracket 46 having the ear portions 46a suitably apertured to receive and hold the spout with its discharge end immediately above the rim of the marking wheel 24. The bracket 46 is supported from the leg 23c of member 23 (see FIG. 5) by clamping it against the leg with nut 25a.

In the operation of the embodiment of the invention as thus far described, the gauge plate 33 is first set relative to the index 32 to reflect the minimum depth which will be satisfactory for the sawed joint. By way of example, let us assume that this depth is one inch, which is the setting shown in FIG. 4. Setting of the gauge plate to a selected position relative to the index plate is done, as previously explained, by loosening the clamping member 34 and pivoting the U-shaped marking wheel support 23 relative to the carrier 30 about the axis of bolt 35 to bring the desired minimum depth (as reflected on the scale on the gauge plate 33) into registry with the index pointer 32a.

It will be understood that the relationship and spacing of the bolt 35 from the support wheel axis, the distances between the latter axis and, respectively, the disk axis and marker wheel axis, and the diameters of the disk marking wheel and support wheels are so interrelated that a fixed (but adjustable) known relationship between upward displacement of the gauge disk relative to the support wheel axis and corresponding downward displacement of the marking wheel is established. The relationship established is one which will insure that whenever the disk 10 is caused to rise above a certain vertical elevation relative to the surface of the slab, the rim of the marking wheel 24 will descend into contact with the slab.

The unit, when set to the desired minimum depth to be measured, is then placed in position with the gauge disk inserted in the joint J and the wheels 28 and 29 straddling same. By pushing on the hand bar 18 the unit is now advanced. The gauge disk rim will ride along the bottom of the groove. So long as the depth of the groove remains below the minimum depth the marker wheel 24 remains above and out of contact with the slab. However, if, as shown in FIG. 3 in the broken lines, the disk encounters a shallow segment as at J', the disk 10 rises as it follows the profile in the groove. Since the support wheels 28 and 29 will, due to their own weight and also to the pivotal connection between the member 23 (to which 30 is connected) remain in contact with the slab, the net result is that the marking wheel is lowered. When the depth decreases below 1 inch, the marking wheel contacts the slab and so long as this depth (or a lesser one) is present, the marking wheel will deposit a visible ink strip immediately adjacent the joint. As the depth increases again and exceeds the minimum, the marking wheel is lifted from the slab and the marking will cease.

The unit thus is capable of automatically marking, as they are encountered, the segments of the joint where the depth is less than the desired minimum. The saw operator can then, following along and using the marked strips as a guide, resaw the joint to insure that the proper depth is provided. It is important to note that no fixed attitude for the handle structure 12 is required to obtain successful operation of the unit. Thus, the unit can be operated by men of differing height, and there is no possibility of error resulting from shifting of the pushing attitude of the handle structure 12.

The unit can easily be rolled from one joint to another using the gauge disk as a support. It is easy to balance the unit with the disk in a vertical plane.

While normally the index plate 32 is at all times firmly and immovably secured to the leg 30b of member 30, it will be observed from FIG. 4 that the index plate is provided with an elongate slot 32b through which the machine screw 37 extends. If the radius of the gauge wheel should decrease because of wear, the gauge plate can be re-zeroed by loosening screw 37 and shifting the plate until the scale and pointer accurately reflect the relationship between the lowermost points on the gauge disk 10 and marking wheel 24 relative to the support wheels 28 and 29.

The ink supply on the marking wheel 24 is replenished as needed by manipulation of the control rod 43, as earlier described.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. Apparatus operable to provide a visible mark adjacent one edge of an elongate groove in a slab whenever the depth of the groove is less than a preselected value comprising a depth gauge member having a portion loosely insertable in said groove and contacting and movable along the bottom of the groove in the direction of the run of the groove, means connected with an operable to propel said gauge member along said groove whereby to cause said gauge member to follow the profile of the groove bottom and to rise and fall in accordance with variations in said profile, slab engaging means positioned adjacent said gauge member, movable means interconnecting said gauge member and said slab engaging means and actuated responsive to the change in elevation of said gauge member relative to said slab engaging means as said member is advanced along said groove, said means including a mark making structure spaced laterally from said gauge member in overlying relationship with the slab adjacent the groove operable to deposit a marking substance on said slab adjacent said groove whenever the elevation of said member relative to said slab engaging means exceeds a preselected value.

2. Apparatus operable to provide a visible mark adjacent one edge of an elongate groove in a slab whenever the depth of the groove is less than a preselected value comprising a gauge disk insertable in said groove with the rim of the disk contacting and movable along the bottom of the groove, means operable to propel the gauge disk along the groove whereby said disk rises and falls as it advances to reflect the profile of the groove bottom, slab engaging means positioned adjacent said gauge disk, moveable means interconnecting said gauge disk and said slab engaging means and actuated responsive to the change in elevation of said gauge disk relative to said slab engaging means as said disk is advanced along said groove, said moveable means including a marking element in close proximity to but spaced laterally from said gauge disk in overlying relationship with the slab adjacent the groove and operable to deposit a marking substance on said slab adjacent the groove whenever the elevation of said disk relative to said slab engaging means exceeds a preselected value.

3. Apparatus operable to provide a visible mark adjacent one edge of an elongate groove in a slab whenever the depth of the groove is less than a preselected value comprising a gauge disk insertable in said groove with the rim contacting and movable along the bottom of the groove, means operable to propel the gauge disk along the groove whereby said disk rises and falls to reflect the changing profile of the groove bottom, a slab engaging roller adjacent and to one side of said disk with the lowest point on its rim above the lowest point on the rim of the gauge disk, marking means positioned to one side of said disk with a marking portion adapted to overlie said slab when the disk is in said groove, and actuating means connecting said gauge disk, said slab engaging roller and also operably connected with said marking means and operable, in response to the rise of said disk relative to the slab engaging roller, to lower said marking means with respect to said disk.

4. Apparatus as in claim 3 wherein said marking means includes a roller having a porous surface capable of retaining a quantity of liquid marking substance therein.

5. Apparatus as in claim 4 including means operable to selectively deposit liquid marking substance on said surface.

6. Apparatus operable to provide a visible marking adjacent one edge of an elongate groove in a slab whenever the depth of the groove is less than a preselected value comprising a gauge disk insertable in said groove with the rim contacting and movable along the bottom of the groove, means operable to propel the gauge disk along the groove whereby said disk rises and falls to reflect the changing profile of the groove bottom, a beam member having its forward end pivotally connected with said gauge disk, wheel means connected with said beam member rearwardly of said forward end and supporting same for rocking movement about an axis transverse to the direction of said groove, and marking means carried by said beam member and operable, responsive to the relative movement between said gauge disk and beam member caused by the rising of said disk above a preselected elevation relative to said slab, to contact said slab adjacent said groove and deposit a marking substance thereon.

7. Apparatus operable to provide a visible mark adjacent one edge of an elongate groove in a slab whenever the depth of the groove is less than a preselected value comprising a depth gauge member having a portion insertable in said groove and contacting and movable along the bottom of the groove, means operable to propel said gauge member along said groove whereby to cause said gauge member to rise and fall in accordance with any changes in the profile of the bottom of the groove, a beam member having its forward end pivotally connected with said gauge member, wheel means connected with said beam member rearwardly of said forward end and supporting same for rocking movement about an axis transverse to the direction of said groove, and marking means carried by said beam member and operable, responsive to relative movement between said gauge disk and beam member caused by the rising of said gauge member above a preselected elevation relative to said slab, to contact said slab adjacent said groove and deposit a marking substance thereon.

8. Apparatus operable to provide a visible mark adjacent one edge of an elongate groove in a slab whenever the depth of the groove is less than a preselected value comprising a circular gauge disk of substantially greater radius than the expected maximum depth of the groove, a propelling handle for said disk, the disk being connected with said handle for rotation about the disk axis, a beam member also connected with said handle for pivotal movement with respect thereto, wheel means positioned to engage and ride upon said slab when said disk is inserted in said groove, said beam member connected with and supported by said wheel means for rocking movement about an axis parallel with but spaced from said disk axis, and marking means connected with and supported by said beam member, said marking means being so located that movement of the disk in an upward direction relative to said slab causes movement of said marking means downwardly toward the slab surface.

9. Apparatus as in claim 8 wherein said marking means includes a roller provided on its rim with a porous retaining tab for receiving and holding a liquid marking substance.

10. Apparatus as in claim 9 including a liquid marking substance reservoir mounted on said handle, and dispensing means selectively operable to transfer said substance from said reservoir to said pad.

11. Apparatus as in claim 8 wherein said marking means is connected with said beam member for adjustment toward and away from said slab relative to said beam member.

References Cited in the file of this patent
UNITED STATES PATENTS

| | | |
|---|---|---|
| 2,045,563 | Benson | June 30, 1936 |
| 2,936,470 | Meeds | May 17, 1960 |